(12) United States Patent
Lim et al.

(10) Patent No.: US 12,597,796 B2
(45) Date of Patent: Apr. 7, 2026

(54) METHOD AND SYSTEM USING A BATTERY VOLTAGE LOOP UNDER HIGH-CURRENT CONDITIONS

(71) Applicant: Renesas Electronics America Inc., Milpitas, CA (US)

(72) Inventors: Sungkeun Lim, Cary, NC (US); Yen-Mo Chen, Morrisville, NC (US); Bin Li, Apex, NC (US)

(73) Assignee: Renesas Electronics America Inc., Milpitas, CA (US)

( * ) Notice: Subject to any disclaimer, the term of this patent is extended or adjusted under 35 U.S.C. 154(b) by 778 days.

(21) Appl. No.: 18/077,039

(22) Filed: Dec. 7, 2022

(65) Prior Publication Data
US 2024/0014680 A1 Jan. 11, 2024

Related U.S. Application Data

(60) Provisional application No. 63/359,300, filed on Jul. 8, 2022.

(51) Int. Cl.
H02J 7/00 (2006.01)

(52) U.S. Cl.
CPC ...... H02J 7/007182 (2020.01); H02J 7/0047 (2013.01); H02J 7/00711 (2020.01)

(58) Field of Classification Search
USPC .......................................................... 320/134
See application file for complete search history.

(56) References Cited

U.S. PATENT DOCUMENTS

| | | | | |
|---|---|---|---|---|
| 10,594,152 B1 * | 3/2020 | Zhao | ................. | H02J 7/007182 |
| 2012/0268063 A1 * | 10/2012 | Qiu | ........................... | H02J 7/02 |
| | | | | 363/84 |
| 2014/0312855 A1 * | 10/2014 | Kung | .................... | H02M 3/155 |
| | | | | 320/163 |

* cited by examiner

*Primary Examiner* — Samuel Berhanu
(74) *Attorney, Agent, or Firm* — SCULLY, SCOTT, MURPHY & PRESSER, P.C.

(57) ABSTRACT

Systems and methods for using a battery voltage loop under high-current conditions are described. A method for operating a charger, the method includes setting, by a charger controller, a battery voltage threshold; setting, by the charger controller, an on-the-go (OTG) voltage threshold; computing, by a first comparator, a battery voltage error based on a difference between a battery voltage and the battery voltage threshold; computing, by a second comparator, an OTG voltage error based on a difference between an OTG voltage and the OTG voltage threshold; and selecting, by a loop selector, a battery voltage loop when the battery voltage error is smaller than the OTG voltage error.

20 Claims, 4 Drawing Sheets

METHOD AND SYSTEM USING A BATTERY VOLTAGE LOOP UNDER HIGH-CURRENT CONDITIONS

CROSS-REFERENCE TO RELATED APPLICATION

The present application claims the benefit of U.S. Patent Application No. 63/359,300, titled "BATTERY VOLTAGE LOOP" and filed on Jul. 8, 2022, which is hereby incorporated by reference in its entirety.

BACKGROUND

Unless otherwise indicated herein, the materials described in this section are not prior art to the claims in this application and are not admitted to be prior art by inclusion in this section. The present disclosure relates in general to systems and methods of controlling semiconductor devices, more particularly, to control of a power converter under high-current conditions.

A rechargeable consumer electronic device typically includes a battery and a charging port. The battery may be used to power the electronic device, as a first device, and/or the battery in the first device may be used to provide power to a second electronic device connected to the first device. Occasionally, the power demands from the second device may exceed the power delivery capabilities of the first device which can cause a degradation of performance for both devices. Such degradation may include an increase in heat, possible damage to various components, and a decrease in an internal voltage when attempting to meet the high-current demand. Such damage may be difficult to detect, leading to a damaged component being sold or used in a product that could perform sub-optimally, leading to a costly return of the product, for example. As a safety mechanism, to avoid operations when a supply voltage is too low, the first device may detect the decreased voltage and determine a fault has occurred that requires initiation of a power-on-reset (POR) operation to clear the fault. Such a POR operation is usually disruptive for an extended period of time, and may also require user intervention to restore the device to proper operation following the reset. A solution is needed for these and other problems.

SUMMARY

According to one example, a semiconductor device is generally described. The semiconductor device may include a charger including a charger controller and a power stage, the power stage having a power stage first side and a power stage second side, the power stage first side configured to connect to a voltage-sensitive component, the power stage second side configured to connect to a load; and a battery monitor coupled to the charger, the battery monitor configured to receive power from a battery and to conduct power from the battery to the power stage first side and the voltage-sensitive component at a system voltage, the battery monitor configured to provide a battery voltage to the charger controller, the battery voltage being related to the system voltage, the power stage second side configured to provide power to the load at an on-the-go (OTG) voltage, wherein the charger controller includes a first comparator configured to compare the battery voltage to a battery voltage threshold and compute a battery voltage error, wherein the charger controller includes a second comparator configured to compare the OTG voltage to an OTG voltage threshold and compute an OTG voltage error, and wherein the charger controller is configured to disable driving the power stage second side to the load when the battery voltage error is less than the OTG voltage error.

According to this example, the semiconductor device wherein the charger controller includes a pulse width modulation control module configured to control at least one pulse width modulator configured to drive the power stage second side when enabled. The semiconductor device wherein the charger controller enables driving the power stage second side to the load when the battery voltage error is greater than or equal to the OTG voltage error. The semiconductor device wherein the power stage is a buck-boost power stage, the charger comprising a buck-boost charger. The semiconductor device wherein the power stage is a buck power stage, the charger comprising a buck charger. The semiconductor device wherein the battery monitor includes a voltage divider disposed between the battery and the power stage first side. The semiconductor device wherein the voltage-sensitive component includes a power on reset module having a power on reset threshold. The semiconductor device wherein the voltage-sensitive component is a micro-controller unit.

According to another example, a semiconductor system is generally described. A semiconductor system may include a voltage-sensitive component; a charger including a charger controller and a power stage, the power stage having a power stage first side and a power stage second side, the power stage first side configured to connect to a voltage-sensitive component, the power stage second side configured to connect to a load; a battery; and a battery monitor coupled to the charger, the battery, and the voltage-sensitive component, the battery monitor configured to receive power from the battery and conducting power from the battery to the power stage first side at a system voltage, the battery monitor configured to provide a battery voltage to the charger controller, the battery voltage being related to the system voltage, the power stage second side configured to provide power to the load at an on-the-go (OTG) voltage, wherein the charger controller includes a first comparator configured to compare the battery voltage to a battery voltage threshold and compute a battery voltage error, wherein the charger controller includes a second comparator configured to compare the OTG voltage to an OTG voltage threshold and compute an OTG voltage error, and wherein the charger controller is configured to disable driving the power stage second side to the load when the battery voltage error is less than the OTG voltage error.

According to this example, the semiconductor system wherein the charger controller includes a pulse width modulation control module configured to control at least one pulse width modulator configured to drive the power stage second side when enabled. The semiconductor system wherein the charger controller enables driving the power stage second side to the load when the battery voltage error is greater than or equal to the second error. The semiconductor system wherein the power stage is a buck-boost power stage, the charger comprising a buck-boost charger.

According to yet another example, a method for operating a charger, the method includes setting, by a charger controller, a battery voltage threshold; setting, by the charger controller, an on-the-go (OTG) voltage threshold; computing, by a first comparator, a battery voltage error based on a difference between a battery voltage and the battery voltage threshold; computing, by a second comparator, an OTG voltage error based on a difference between an OTG voltage and the OTG voltage threshold; and selecting, by a loop selector, a battery voltage loop when the battery voltage error is smaller than the OTG voltage error.

According to this example, the method further includes disabling, by the charger, power delivery through a power stage to a load when the battery voltage loop is selected. The method includes sustaining, by a battery monitor, power to a voltage-sensitive component when the battery voltage loop is selected. The method wherein the battery voltage threshold is higher than a power on reset threshold for the voltage-sensitive component. The method wherein the voltage-sensitive component is a microcontroller unit. The method further includes selecting, by a loop selector, an OTG voltage loop when the battery voltage error is greater than or equal to the OTG voltage error; and enabling, by the charger, power delivery through a power stage to a load when the OTG voltage loop is selected. The method further includes regulating, by the charger, power delivery through a power stage to a load when the OTG voltage loop is selected. The method wherein the power stage is a buck-boost power stage, the charger comprising a buck-boost charger.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

DETAILED DESCRIPTION

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

To be described in more detail below, a battery voltage loop under high-current conditions technique can be implemented by a system described in accordance with the present disclosure. The system can provide a battery voltage loop solution that can be relatively compact, allowing the battery voltage loop technique described herein to fit in applications with limited size, weight, and cost. The described solution recognizes the disruptions that may be caused by high-current conditions in some applications. Thus, the described solution eliminates power-on-reset operations. Moreover, the system can provide an efficient high-current condition handling technique for use with various consumer electronic devices.

Figure 1A:
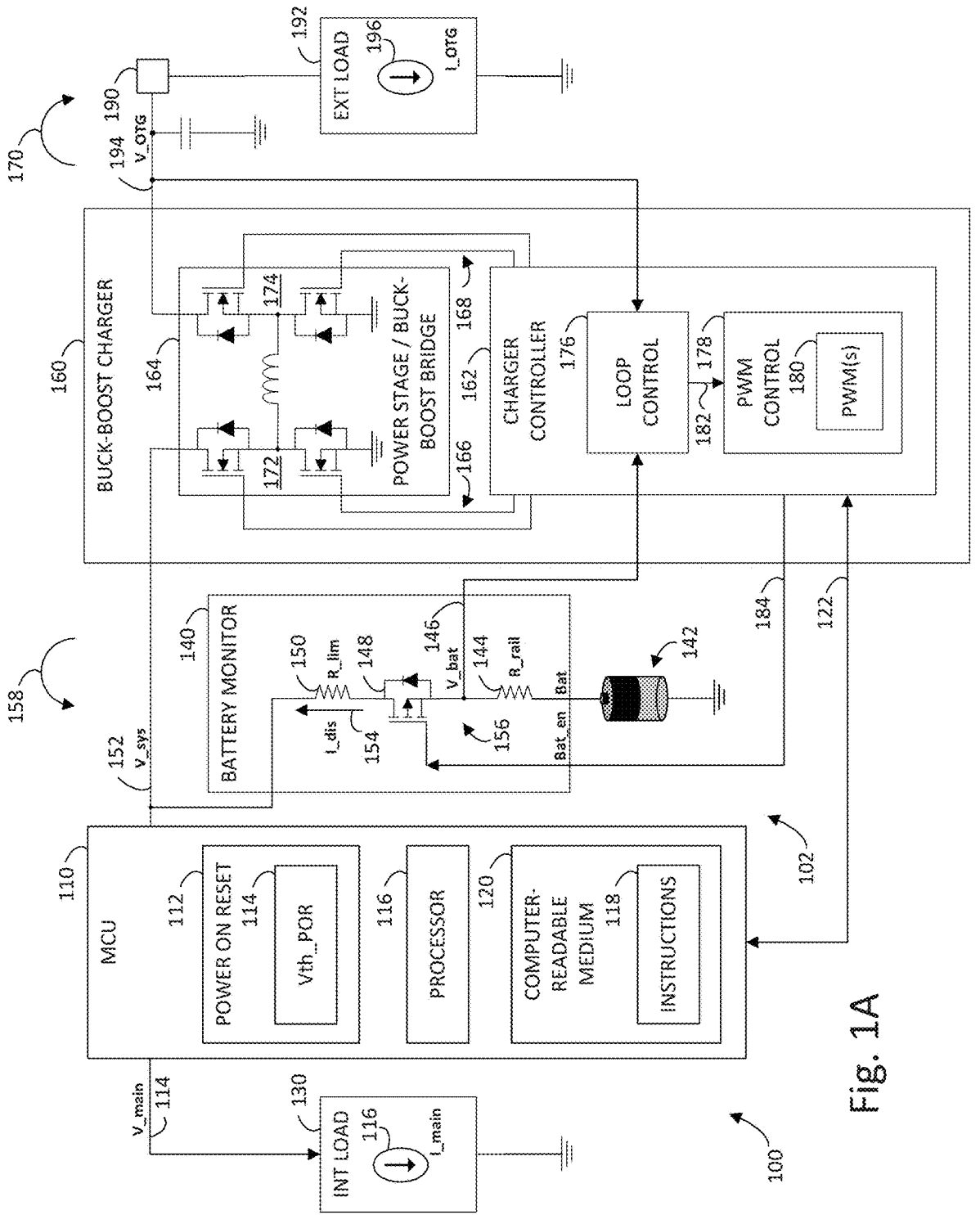
FIG. 1A illustrates an example of an electronic system that can implement a battery voltage loop and operate a charger under high-current conditions in accordance with various examples of the present disclosure.

FIG. 1A illustrates an example of an electronic system 100 that can implement a battery voltage loop and operate a charger under high-current conditions in accordance with various examples of the present disclosure. Electronic system 100 may include two or more electronic devices or components. Electronic system 100 may include an electronic device 102 which can be implemented generally as a semiconductor device or a semiconductor system along with one or more semiconductor circuits, semiconductor chips, memory elements, discrete components, and the like. According to an example, electronic device 102 may include a microcontroller unit (MCU) 110 connected to an internal load 130, a battery monitor 140, a battery 142 connected to battery monitor 140, and a charger 160 (e.g., a buck-boost charger or a buck charger) including a charger controller 162 and a power stage 164 (e.g., a buck-boost bridge circuit or a buck bridge circuit) connected to charger 162. Each of these elements will be described more fully below.

MCU 110 may include a power on reset module 112 having a power on reset threshold voltage 114 (Vth_POR). MCU 110 may be considered a voltage-sensitive component because one or more aspects of MCU 110 performance may be negatively impacted, or MCU 110 itself may be damaged, when attempting to operate MCU 110 at a voltage that is lower than the normal operating voltage (or other related parameters) specified for MCU 110, or another component driven by MCU 110, where the voltage level where degradation or damage may occur is usually lower than or equal to a power on reset threshold voltage 114. For example, a computer processor may not run at full speed when the supply voltage is too low, data may be corrupted within the processor or memory coupled to the processor, or internal circuits may become stuck in an intermediate state (e.g., not logic high, not logic low) so the power consumption of the circuits may increase rapidly causing a corresponding increase in heat which could damage or destroy at least a portion of the semiconductor circuit. Additionally, a device driver may be a voltage-sensitive component (e.g., semiconductor device) where internal circuits do not switch rapidly enough leading to high power consumption, and heat problems may occur, as described above. Other component types may also be affected negatively by low-voltage operation. Hence, operation of a voltage-sensitive component at a voltage that is below a specified voltage level may be considered a fault condition, and a power on reset (POR) operation may be needed to clear the fault. Such a POR operation is usually disruptive for an extended period of time, and may also require user intervention to restore the device to proper operation following the reset.

MCU 110 may also include a processor 116, such as a microprocessor configured to read program instructions 118 (e.g., computer implemented code) from a non-transitory computer-readable medium 120 such as a read-only memory (ROM), a random access memory (RAM), a programmable logic device (PLD), a flash drive, a memory card/stick, a solid-state storage device, or the like. Program instructions 118, read from computer-readable medium 120 by processor 116 and/or specialized controller as a processor device, may cause processor 116 to execute operations corresponding to the functions, processes, and methods described herein with reference to FIG. 1 to FIG. 4C, as will be discussed more fully below. Computer-readable medium 120 may be removable, replaceable, or re-writeable so that program instructions 118 in computer-readable medium 120 may be modified, upgraded, or replaced. MCU 110 may also include various Arithmetic and Logical Units (ALUs) to perform calculation and comparison operations. MCU 110 may receive control signals and provide status signals to charger controller 162 through control and status interface 122. In this manner, MCU 110 may provide control signals, may provide instructions, voltage reference values, or set control register values or signals based on program instructions 118 to charger 160, and may receive status from charger 160.

Battery monitor 140 may include various components as are needed to monitor and control power from and to battery 142, as herein described. For example, battery monitor 140 may receive power from battery 142 and conduct the received power serially through a first resistor 144 (R_rail) at a battery voltage 146 (V_bat), through current control element 148 (e.g., a p-channel metal oxide semiconductor field effect transistor (MOSFET)), through a second resistor 150 (R Jim) at a system voltage 152 (V_sys), and finally to a power stage first side 172 that is also connected to supply power to MCU 110. In this manner, battery monitor 140 may provide a battery voltage 146 to charger 160 corresponding to the voltage in battery monitor 140 after the first resistor 144. Further, battery monitor 140 may provide a system voltage 152 (V_sys), corresponding to the voltage after second resistor 150 to charger 160 and MCU 110 based on a discharge current 154 (I_dis) flowing serially through first resistor 144 and second resistor 150 to discharge battery 142 in a charger 160 reverse mode (e.g., battery 142 discharging) of operation.

Battery voltage 146 may be related to system voltage 152 (V_sys) based on the values of first resistor 144 and second resistor 150 and discharge current 154 (I_dis) in a voltage divider 156 arrangement, where the voltage divider is disposed between battery 142 and power stage first side 172. For simplicity, a resistance value of current control element 148 and a voltage drop across current control element 148 in voltage divider 156 are considered negligible. Finally, charger 160 may assert an enable signal 184 to enable reverse current to flow through current control element 148 to charge battery 142 in a charger 160 forward mode of operation (e.g., battery 142 charging). Battery 142 may be implemented as a nickel-metal hydride (NiMH), Nickel-Cadmium (NiCd), or Lithium Ion (Li-ion) battery of various voltage and current capacities, or a battery module including two or more batteries connected serially or in parallel in some manner, for use in charging (e.g., receiving power from connector 190) battery 142 and discharging (e.g., supplying power) battery 142 to power various internal and/or external loads, as described.

Charger 160 may comprise a charger controller 162 and a power stage 164 coupled to charger controller 162 and configured to operate power stage 164 through gate control signals 166 (e.g., power stage first side) and gate control signals 168 (e.g., power stage second side) to provide power from battery 142 through power stage 164, through connector 190, and to an external load 192 in what is designated an on-the-go (OTG) voltage loop 170 because charger 160 is regulating power stage 164 to drive external load 192. The designation "OTG" may refer generally to operations that are "on the go", and may refer to battery-powered operations where battery 142 is discharging and/or charger 160 is operating in a reverse (e.g., battery discharging) mode. An OTG voltage 194 (V_OTG) and an OTG current 196

(I_OTG) provided by charger 160 may characterize the power provided to external load 192.

Power stage 164 may have various configurations and may be implemented in various arrangements. In one configuration, power stage 164 may be in a buck-boost arrangement, as shown in FIG. 1A, so the combination of a buck-boost power stage 164 along with charger controller 162 comprises a buck-boost charger 160. An advantage of utilizing buck-boost power stage 164 includes the ability to provide an output voltage that is higher than an input voltage compared with a buck charger 160A, to be described below. With brief reference to FIG. 1B, power stage 164 may alternatively be in a buck arrangement. In this alternative, power stage 164A may be in a buck arrangement, so the combination of a buck power stage 164A along with charger controller 162 comprises a buck charger 160A including a charger controller 162A, shown with various elements omitted for simplicity. Charger controller 162A may be configured to operate power stage 164A through gate control signals 168A (e.g., power stage second side) to provide power from battery 142 through power stage 164A, through connector 190, and to an external load 192. Advantages of utilizing buck power stage 164A includes the ability to provide an output voltage that is lower than an input voltage at a lower cost compared with the arrangement of power stage 164 with charger controller 162 comprising a buck-boost charger 160.

Returning to FIG. 1A, charger controller 162 may include a loop control module 176 that controls the operation of a pulse width modulation control module 178 (PWM) including one or more pulse width modulators 180 (PWMs) based on a pulse width modulation control signal 182. PWMs 180 control the operation of first side 172 and second side 174 of power stage 164 to control power delivery to MCU 110 and/or external load 192, respectively.

Figures 1B, 2:
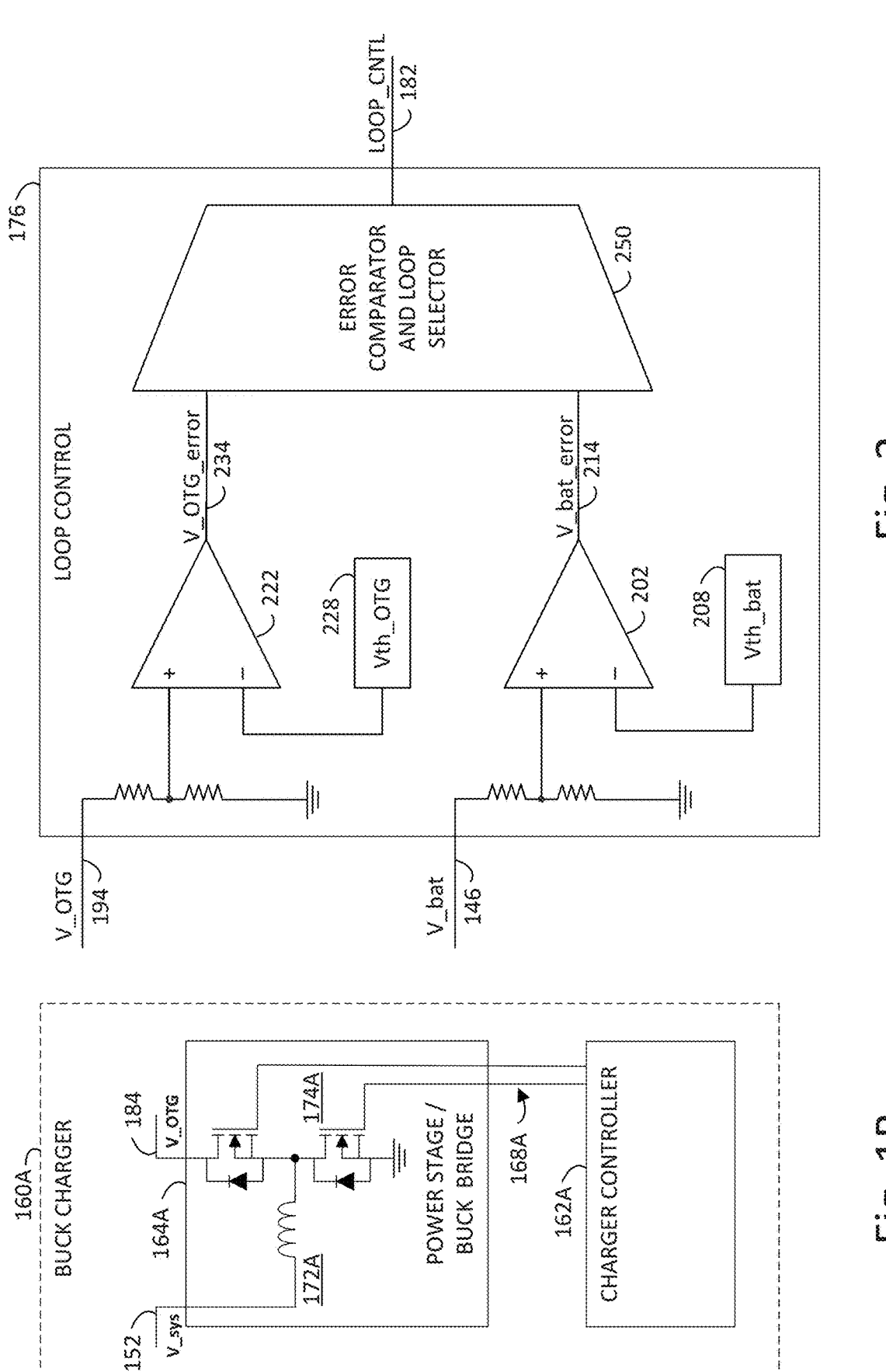
FIG. 1B illustrates an alternative power stage arrangement that may be used with the system of FIG. 1A.
FIG. 2 illustrates an example of a loop control module for a charger controller, in accordance with various examples of the present disclosure.

FIG. 2 illustrates an example of loop control module 176 for charger controller 162, in accordance with various examples of the present disclosure. Loop control module 176 may include a first comparator 202 for comparing a scaled version of battery voltage 146 (V_bat) with a battery voltage threshold 208 value. Battery voltage threshold 208 corresponds to an analog voltage value that may be generated by a selectively enabled resistor network based on a control value written by a processor device, such as processor 116 or charger controller 162, into a register address or stored in a memory address corresponding to battery voltage threshold 208, for example.

First comparator 202 compares a scaled version of battery voltage 146 (V_bat) with battery voltage threshold 208 to produce a battery voltage error 214 (V_bat_error) alternatively described as a first error 214. Similarly, loop control module 176 may include a second comparator 222 for comparing a scaled version of OTG voltage 194 (V_OTG) with an OTG voltage threshold 228 (Vth_OTG) to produce an OTG voltage error 234 (V_OTG_error) alternatively described as a second error 234. OTG voltage threshold 228 corresponds to an analog voltage value that may be generated by a selectively enabled resistor network based on a control value written by a processor device, such as processor 116 or charger controller 162, into a register address or stored in a memory address corresponding to load voltage threshold 228, for example. First comparator 202 and second comparator 222 may be implemented as discrete components such as analog computing elements. Alternatively, first comparator 202 and second comparator 222 may be implemented in digital hardware using arithmetic and/or logical units as computing elements.

Battery voltage error 214 and OTG voltage error 234 are compared with each other in error comparator and loop selector 250 to determine which of the battery voltage error 214 and OTG voltage error 234 is smaller. The result of this comparison is used to control behavior of charger 160. For example, when charger 160 is operating power stage 164 to provide power to external load 192 which may draw an excessive amount of OTG current 196, the OTG voltage 194 (V_OTG) may then begin to drop along with the system voltage 152 (V_sys). In this manner, both system voltage 152 and OTG voltage 194 may both be reduced in magnitude. As described, system voltage 152 (V_sys) may be applied to power MCU 110, which may be considered to be a voltage-sensitive component. Battery voltage threshold 208 (Vth_bat) may be selected to match the scaled version of battery voltage 146 (V_bat) so that battery voltage error 214 (V_bat_error) will be reduced and eventually may approach zero before system voltage 152 (V_sys) reaches a power on reset voltage threshold 114 (Vth_POR) in order to avoid MCU 110 from initiating a power on reset operation to clear the fault of low system voltage 152 (V_sys) caused by the excessive OTG current 196 (I_OTG), and to avoid possible damage to MCU 110. Stated differently, sustaining MCU 110 during a heavy or high-current condition (e.g., heavy output current 196 assertion), may prevent system shut down and subsequent unavailability due to initiation of a power on reset (POR) operation following temporary voltage fluctuations. Similarly, OTG voltage threshold 228 (Vth_OTG) may be selected to match the scaled version of OTG voltage 194 (V_OTG) so that OTG voltage error 234 (V_OTG_error) will be reduced and may approach zero. It is expected that battery voltage error 214 (V_bat_error) may approach zero faster, and at a faster rate, during a high-current event than OTG voltage error 234 (V_OTG_error) may approach zero. In this manner, it is expected battery voltage error 214 will be smaller than second error 234 so that a battery voltage loop 158 is selected by charger 160 which is then disabled from driving external load 192 (e.g., charger 160 is no longer regulating power stage 164 to drive external load 192) in time to avoid initiation of a power on reset operation. During this time, system voltage 152 (V_sys) is applied from battery 142, through battery monitor 140, to MCU 110.

When battery voltage error 214 is smaller than or equal to OTG voltage error 234, loop control 182 selects battery voltage loop 158 where charger 160 disables the output to the load 192 and clamps (V_sys) to the battery voltage and then produces a loop control signal 182 (LOOP_CNTL) for controlling the operation of pulse width modulation control module 178, to avoid V_sys dropping below a POR threshold voltage which would initiate a power on reset operation, causing disruption of operations. In this manner, battery voltage loop 158 sustains the operation of voltage-sensitive component 110 throughout the high-current conditions on external load 192. In this case, the value of system voltage 152 (V_sys) may be sustained at (e.g., "clamped" at) Vth_bat−I_dis*(R_lim+R_rail) based on the component values for first resistor 144 (R_rail), second resistor 150 (R_lim), and battery discharge current 154 (I_dis), during a high or heavy OTG current 196 (I_OTG) demand event.

Figure 3:
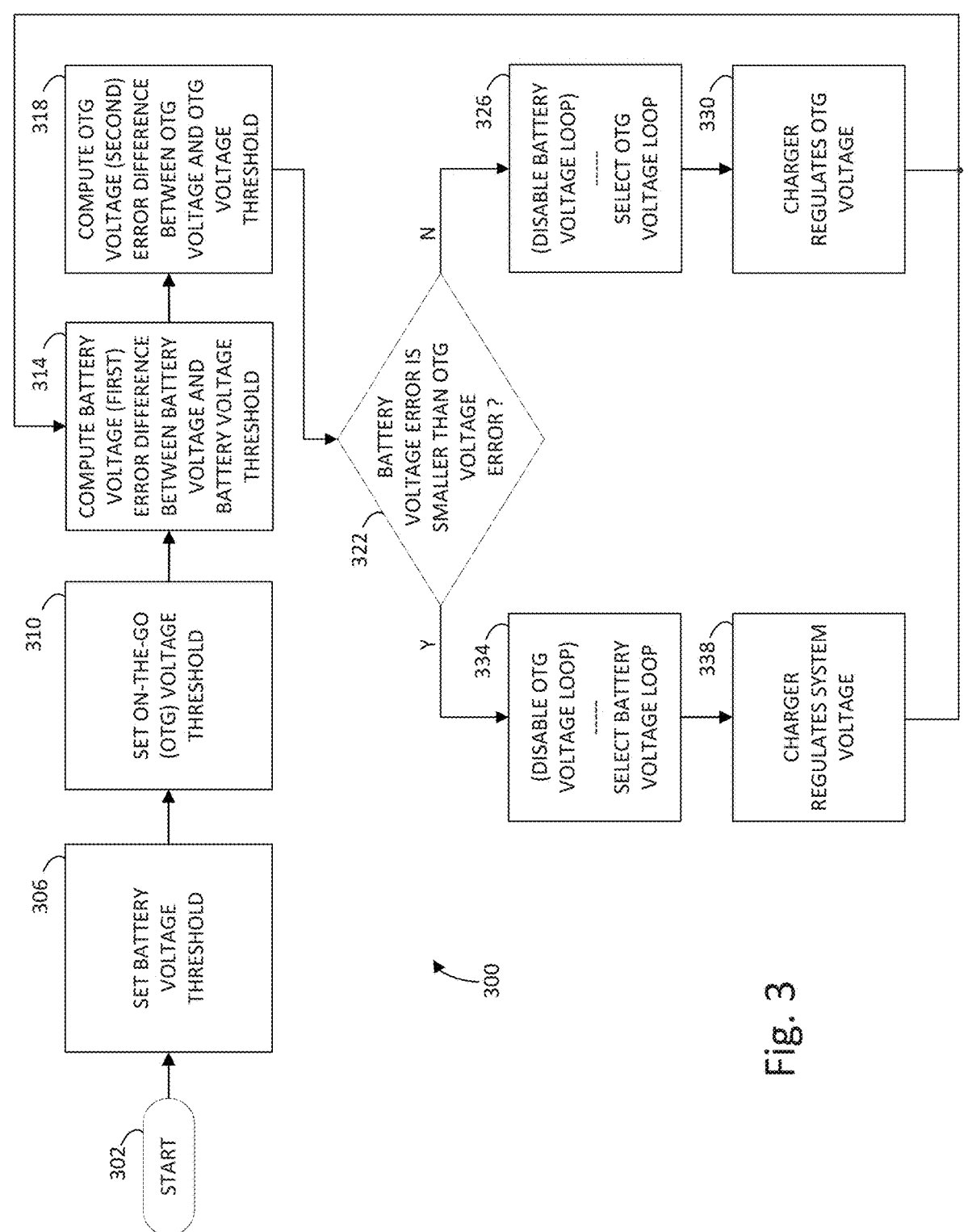
FIG. 3 is a flow diagram illustrating a method for operating a charger and selecting a battery voltage loop under high-current conditions, in accordance with various examples.

FIG. 3 is a flow diagram illustrating a method for operating a charger and selecting a battery voltage loop under high-current conditions, in accordance with various examples. Method 300 (e.g., process 300) may be implemented on hardware such as electronic system 100 or electronic device 102 described in reference to FIG. 1A to FIG. 2. An example process may include one or more operations, actions, or functions as illustrated by one or more of blocks 306-338, as illustrated in FIG. 3. Although illustrated as discrete blocks, various blocks may be divided into additional blocks, combined into fewer blocks, eliminated, performed in a different order, or performed in parallel, when not prohibited, depending on the desired implementation.

With reference to FIG. 1A to FIG. 3, method 300 begins in step 302 and proceeds to step 306 to set (e.g., to program) battery voltage threshold 208 (Vth_bat). Method 300 proceeds to step 310 to set an on-the-go (OTG) voltage threshold 228 (Vth_OTG). In this manner, both battery voltage threshold 208 and OTG voltage threshold 228 are set or programmed and may be said to be a programmed battery voltage threshold and a programmed OTG voltage threshold, respectively. After setting both threshold voltage levels, method 300 proceeds to step 314 with computing a battery voltage error 214 (V_bat_error) by comparing a scaled version of battery voltage 146 (V_bat) with battery voltage threshold 208 to determine a difference between battery voltage 146 and battery voltage threshold 208 and produce battery voltage error 214 (V_bat_error) alternatively described as a first error 214. Battery threshold voltage 208 is selected based on the values of the scaling resistors and the various component values in battery monitor 140, for example. Method 300 proceeds to step 318 with computing an OTG voltage error 234 (V_OTG_error) by comparing a scaled version of OTG voltage 194 (V_OTG) with OTG voltage threshold 228 (Vth_OTG) to determine a difference between OTG voltage 194 and OTG voltage threshold 228 and produce OTG voltage error 234 (V_OTG_error) alternatively described as a as a second error 234.

After setting initial conditions and computing error values, method 300 proceeds to step 322 (e.g., decision step) where battery voltage error 214 (V_bat_error) is compared with OTG voltage error 234 (V_OTG_error) to determine which error is smaller, and an operating mode is selected based on this comparison. When battery voltage error 214 is less than (e.g., smaller than) OTG voltage error 234 (step 322 (Y)), method 300 proceeds to step 334 where charger 160 disables OTG voltage loop 170 (if previously enabled) and charger 160 selects (e.g., enables) battery voltage loop 158 (e.g., enters battery voltage loop mode). After step 334, method 300 proceeds to step 338 where charger 160 regulates system voltage 152 (V_sys) to operate battery voltage loop 158 and continue powering MCU 110, or other voltage-sensitive component, directly using power from battery 142 and not regulating OTG voltage 194 on load 192. In this manner, operating battery voltage loop 158 (V_bat loop mode) includes sustaining one or more voltage-sensitive components 110.

Returning to step 322, if battery voltage error 214 is greater than or equal to OTG voltage error 234 (step 322 (N)), method 300 proceeds to step 326 where charger 160 disables battery voltage loop 158 (if previously enabled) and charger 160 selects (e.g., enables) OTG voltage loop 170 (e.g., enters OTG voltage loop mode). After step 326, method 300 then proceeds to step 330 where charger 160 regulates OTG voltage 194 (V_OTG) to operate OTG voltage loop 170 (e.g., OTG voltage loop mode) under normal output current conditions, also designated V_OTG voltage loop mode. That is, in V_OTG loop mode corresponding to OTG voltage loop 170, where load 192 is not drawing excessive current (e.g., not demanding heavy output current 196) beyond the specified current delivery capability of charger 160 in either a transient or steady-state condition. Stated differently, step 330 includes regulating (e.g., driving) OTG current 196 as an output loop with charger 160. After either step 330 or step 338, method 300 returns to step 314 to again compute battery voltage error 214 and then step 318 to compute OTG voltage error 234, and the cycle repeats. It is not intended that method 300 will terminate while power is available from battery 142.

Figures 4A, 4B, 4C:
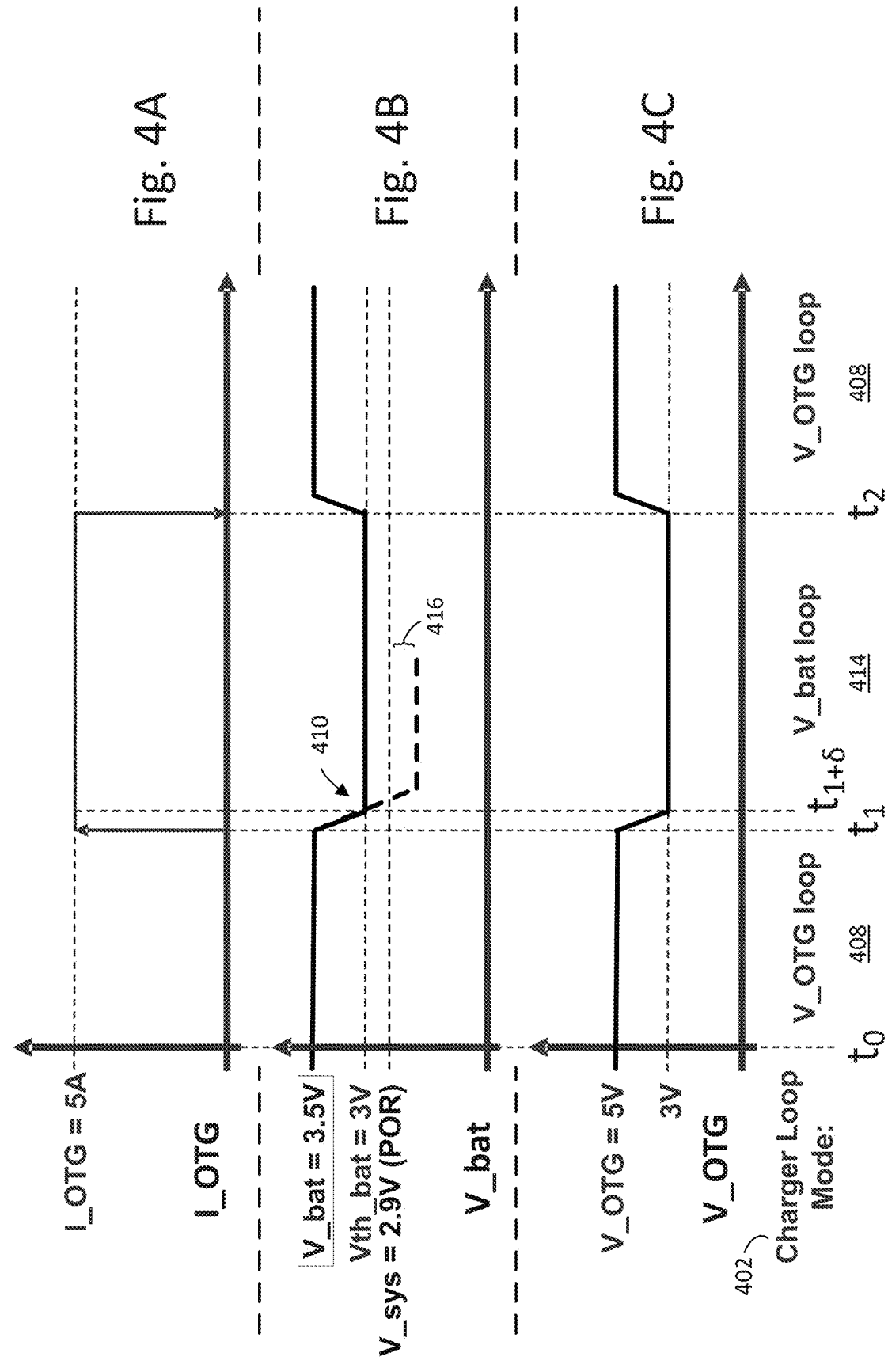
FIG. 4A to FIG. 4C are waveform diagrams illustrating operation of a battery voltage loop under high-current conditions, in accordance with various examples.

FIG. 4A to FIG. 4C are waveform diagrams illustrating operation of a battery voltage loop under high-current conditions, in accordance with various examples. FIG. 4A is directed to OTG current 196 (I_OTG) drawn by load 192 illustrating a high-current example. FIG. 4B is drawn to the behavior of battery voltage 146 (V_bat) during the high-current example. FIG. 4C is drawn to the OTG voltage 194 (V_OTG) during the high-current example. Each of FIG. 4A to FIG. 4C is aligned to show the relative behavior of these three parameters as well as the state of charger 160 corresponding to the illustrated operational mode. By considering FIG. 1 to FIG. 3, together with FIG. 4A to FIG. 4C, a coherent illustration of the behavior of electronic system 100 may be presented.

At time zero (e.g., to) FIG. 4A illustrates an example where charger 160 may be driving load 192 (e.g., regulating OTG current 196) which is drawing current that is within the ability of charger 160 to supply, and charger 160 may be in mode V_OTG loop 408 corresponding to OTG voltage loop 170. In this example, at time zero and immediately after, battery voltage 146 (V_bat) may be about 3.5 V and OTG voltage 194 may be about 5V.

At time one (e.g., t₁), the OTG current 196 drawn by load 192 may increase to a high-current level, beyond the ability of charger 160 to easily supply, going from an OTG current 196 of near 0 A (e.g., zero amps) to about 5 A. After a brief delay, time one plus a small delta time (e.g., t₁+δ), charger 160 begins to experience the effects of a high-current draw from load 192 and system voltage 152 (V_sys) on the input to voltage-sensitive component 110 begins to drop, along with battery voltage 146 (V_bat) as shown in FIG. 4B. Also, as shown in FIG. 4C, OTG voltage 194 begins to drop. During this time, first comparator 202 determines the difference between battery voltage 146 and battery voltage threshold 208, while second comparator 222 determines the difference between OTG voltage 194 and OTG voltage threshold 228. After this brief time, time one plus a small delta time, battery voltage 146 may have reached battery voltage threshold 208 as indicated by reference 410, while second comparator 222 determines that OTG voltage 194 is still larger than OTG voltage threshold 228, so that the battery voltage error 214 (V_bat_error) is smaller than or less than OTG voltage error 234 (V_OTG_error). In this case, error comparator and loop selector 250 may determine battery voltage error 214 is smaller than OTG voltage error 234 and assert loop control 182 selecting battery voltage loop 158 corresponding to V_bat loop 414, and charger 160 may change modes from V_OTG loop 408 to V_bat loop 414. If error comparator and loop selector 250 had not detected battery voltage 146 approaching battery voltage threshold 208 and changed charger loop mode 402, both system voltage 152 (V_sys) and battery voltage 146 (V_bat) may continue to drop until power on reset module 112 detects system voltage 152 (V_sys) had reached or exceeded (e.g., in a negative direction) power on reset voltage threshold 114, as shown by reference 416, so that voltage-sensitive component 110 may then initiate a power on reset operation to correct this fault and avoid possible damage to voltage-sensitive component 110, or avoid possible damage to the electronic system 100 generally.

Finally, at time two (e.g., t₂), load 192 ceases drawing a high current, and OTG current 196 draws a current that is within the ability of charger 160 to supply. System voltage 152 (V_sys) and battery voltage 146 (V_bat) begin to rise so that battery voltage error 214 is larger than OTG voltage error 234, and error comparator and loop selector 250 may assert loop control 182 (again) selecting OTG voltage loop 170 corresponding to V_OTG loop 408. Thus, charger 160 may change modes from V_bat loop 414 to V_OTG loop 408 (e.g., return again to V_OTG loop 408) corresponding to OTG voltage loop 170.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The various embodiments were chosen and described in order to best explain the principles of the invention and the practical application, and to enable others of ordinary skill in the art to understand the invention for various embodiments with various modifications as are suited to the particular use contemplated.

What is claimed is:

1. A semiconductor device, comprising:

a charger comprising a charger controller and a power stage, the power stage having a power stage first side and a power stage second side, the power stage first side configured to connect to a voltage-sensitive component, the power stage second side configured to connect to a load; and a battery monitor coupled to the charger, the battery monitor configured to receive power from a battery and to conduct power from the battery to the power stage first side and the voltage-sensitive component at a system voltage, the battery monitor configured to provide a battery voltage to the charger controller, the battery voltage being related to the system voltage, the power stage second side configured to provide power to the load at an on-the-go (OTG) voltage, wherein the charger controller includes a first comparator configured to compare the battery voltage to a battery voltage threshold and compute a battery voltage error, wherein the charger controller includes a second comparator configured to compare the OTG voltage to an OTG voltage threshold and compute an OTG voltage error, and wherein the charger controller is configured to disable driving the power stage second side to the load when the battery voltage error is less than the OTG voltage error.

2. The semiconductor device of claim 1, wherein the charger controller includes a pulse width modulation control module configured to control at least one pulse width modulator configured to drive the power stage second side when enabled.

3. The semiconductor device of claim 1, wherein the charger controller enables driving the power stage second side to the load when the battery voltage error is greater than or equal to the OTG voltage error.

4. The semiconductor device of claim 1, wherein the power stage is a buck-boost power stage, the charger comprising a buck-boost charger.

5. The semiconductor device of claim 1, wherein the power stage is a buck power stage, the charger comprising a buck charger.

6. The semiconductor device of claim 1, wherein the battery monitor includes a voltage divider disposed between the battery and the power stage first side.

7. The semiconductor device of claim 1, wherein the voltage-sensitive component includes a power on reset module having a power on reset threshold.

8. The semiconductor device of claim 7, wherein the voltage-sensitive component is a microcontroller unit.

9. A semiconductor system, comprising:

a voltage-sensitive component;

a charger comprising a charger controller and a power stage, the power stage having a power stage first side and a power stage second side, the power stage first side configured to connect to a voltage-sensitive component, the power stage second side configured to connect to a load;

a battery; and a battery monitor coupled to the charger, the battery, and the voltage-sensitive component, the battery monitor configured to receive power from the battery and conducting power from the battery to the power stage first side at a system voltage, the battery monitor configured to provide a battery voltage to the charger controller, the battery voltage being related to the system voltage, the power stage second side configured to provide power to the load at an on-the-go (OTG) voltage, wherein the charger controller includes a first comparator configured to compare the battery voltage to a battery voltage threshold and compute a battery voltage error, wherein the charger controller includes a second comparator configured to compare the OTG voltage to a load voltage threshold and compute an OTG voltage error, and wherein the charger controller is configured to disable driving the power stage second side to the load when the battery voltage error is less than the OTG voltage error.

10. The semiconductor system of claim 9, wherein the charger controller includes a pulse width modulation control module configured to control at least one pulse width modulator configured to drive the power stage second side when enabled.

11. The semiconductor system of claim 9, wherein the charger controller enables driving the power stage second side to the load when the battery voltage error is greater than or equal to the OTG voltage error.

12. The semiconductor system of claim 9, wherein the power stage is a buck-boost power stage, the charger comprising a buck-boost charger.

13. A method for operating a charger, the method comprising:

setting, by a charger controller, a battery voltage threshold;

setting, by the charger controller, an on-the-go (OTG) voltage threshold;

computing, by a first comparator, a battery voltage error based on a difference between a battery voltage and the battery voltage threshold;

computing, by a second comparator, an OTG voltage error based on a difference between an OTG voltage and the OTG voltage threshold; and selecting, by a loop selector, a battery voltage loop when the battery voltage error is smaller than the OTG voltage error.

14. The method of claim 13, the method further comprising:

disabling, by the charger, power delivery through a power stage to a load when the battery voltage loop is selected.

15. The method of claim 14, the method further comprising:

sustaining, by a battery monitor, power to a voltage-sensitive component when the battery voltage loop is selected.

16. The method of claim 15, wherein the battery voltage threshold is higher than a power on reset threshold for the voltage-sensitive component.

17. The method of claim 15, wherein the voltage-sensitive component is a microcontroller unit.

18. The method of claim 13, the method further comprising:

selecting, by a loop selector, an OTG voltage loop when the battery voltage error is greater than or equal to the OTG voltage error; and enabling, by the charger, power delivery through a power stage to a load when the OTG voltage loop is selected.

19. The method of claim 18, the method further comprising:

regulating, by the charger, power delivery through a power stage to a load when the OTG voltage loop is selected.

20. The method of claim 19, wherein the power stage is a buck-boost power stage, the charger comprising a buck-boost charger.

* * * * *